(12) United States Patent
Kirk et al.

(10) Patent No.: US 7,580,389 B2
(45) Date of Patent: Aug. 25, 2009

(54) MEDIUM HOPPING DATA TRANSMITTER

(75) Inventors: Geoffrey Kirk, Redwood City, CA (US); James M. Janky, Los Altos, CA (US); Arthur E. Anderson, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 482 days.

(21) Appl. No.: 11/499,326

(22) Filed: Aug. 3, 2006

(65) Prior Publication Data

US 2006/0268778 A1 Nov. 30, 2006

(51) Int. Cl.
*H04Q 7/00* (2006.01)
(52) U.S. Cl. ...................................... 370/329; 370/341
(58) Field of Classification Search ........................ None
See application file for complete search history.

(56) References Cited

U.S. PATENT DOCUMENTS 5,079,768 A * 1/1992 Flammer .................... 370/349
5,471,645 A * 11/1995 Felix .......................... 455/516
5,729,540 A * 3/1998 Wegrzyn ..................... 370/336
6,512,928 B1 * 1/2003 Janky et al. ............... 455/456.6
6,795,410 B1 * 9/2004 Janky et al. ................. 370/329

* cited by examiner

*Primary Examiner*—Chi H. Pham
*Assistant Examiner*—Soon D. Hyun

(57) ABSTRACT

A first communication device (e.g., the communication device that is sending data) monitors a radio channel in a predetermined set of radio channels. A message is transmitted on the first radio channel if the first radio channel is unoccupied. A second radio channel from the predetermined set of channels is checked if the first radio channel is occupied. The message is sent on the second radio channel if the second radio channel is unoccupied and the message was not sent on the first radio channel. In one embodiment, the transmission is sent in predetermined limited time blocks and predetermined set of channels is limited to a particular number of channels. In one embodiment a channel occupancy map and channel selection algorithm are utilized to establish the predetermined set of channels.

21 Claims, 15 Drawing Sheets

| 1101 — | CHANNEL NO. | 1 | 2 | 3 | 4 | 5 | 6 | 7 | 8 | 9 | 10 |
|---|---|---|---|---|---|---|---|---|---|---|---|
| 1102 — | OCCUPANCY | .2 | .4 | .1 | .6 | .3 | .5 | .4 | .9 | .6 | .3 |
| 1103 — | COMPLIMENT | .8 | .6 | .9 | .4 | .7 | .5 | .6 | .1 | .4 | .7 |
| 1104 — | AVAILABLE? | YES | YES | YES | NO | YES | NO | YES | NO | NO | YES |

```
Checking for radio transmissions on a first radio
channel from a predetermined set of radio channels.
1310
          │
          ▼
Transmitting a message on the first radio channel if
the first radio channel is unoccupied.
1320
          │
          ▼
Checking for radio transmissions on a second radio
channel from a predetermined set of radio channels.
1330
          │
          ▼
Transmitting a message on the second radio channel if
the second radio channel is unoccupied.
1340
```

Utilizing a channel occupancy map to establish a set of radio channels.
1410

Performing a medium hopping radio transmission process.
1420

1500

```
┌─────────────────────────────────────────────────────────┐
│ Synchronizing a plurality of communication devices to a first │
│ radio channel from a predetermined set of radio channels.     │
│                         1510                                  │
└─────────────────────────────────────────────────────────┘
                              ↓
┌─────────────────────────────────────────────────────────┐
│ Checking for radio transmissions on a first radio channel │
│ from a predetermined set of radio channels.               │
│                         1520                              │
└─────────────────────────────────────────────────────────┘
                              ↓
┌─────────────────────────────────────────────────────────┐
│ Transmitting a message on the first radio channel if the │
│ first radio channel is unoccupied.                        │
│                         1530                              │
└─────────────────────────────────────────────────────────┘
                              ↓
┌─────────────────────────────────────────────────────────┐
│ Synchronizing a plurality of communication devices to a  │
│ second radio channel from a predetermined set of         │
│ radio channels.                                          │
│                         1540                             │
└─────────────────────────────────────────────────────────┘
                              ↓
┌─────────────────────────────────────────────────────────┐
│ Checking for radio transmissions on a second radio channel │
│ from a predetermined set of radio channels.                │
│                         1550                               │
└─────────────────────────────────────────────────────────┘
                              ↓
┌─────────────────────────────────────────────────────────┐
│ Transmitting a message on the second radio channel if the │
│ second radio channel is unoccupied.                       │
│                         1560                              │
└─────────────────────────────────────────────────────────┘
```

FIG. 15

MEDIUM HOPPING DATA TRANSMITTER

RELATED APPLICATIONS

This application claims the benefit of a commonly owned co pending U.S. patent application entitled "SLOW HOPPING DATA TRANSMITTER", Ser. No. 10/857,464, filed on May 28, 2004, which is incorporated herein by this reference.

TECHNICAL FIELD

This invention relates to communication systems. Specifically, the present invention relates to an apparatus and method for communicating data between communication devices.

BACKGROUND ART

Radio communication is widely used for conveying data between electronic devices. Typically, communicating data between electronic devices includes transmission of "packets" of digital data. Examples of devices that communicate via radio for communicating data include surveying applications, precision farming applications, etc.

In recent years, the number of persons using licensed and unlicensed frequency bands for voice communications has increased dramatically, making these frequency bands crowded, congested and unavailable for use by users that transmit digital data. Also, persons using licensed and unlicensed frequency bands for voice communications tend to communicate during business hours and during certain times of the day. At these times, desirable frequency bands become highly congested, particularly in densely populated areas, making usage for transmission of digital data difficult if not impossible.

There are many distinct radio bands available to users that transmit digital data, starting at 30-50 MHz and extending into the VHF range (220 MHz to 450-470 MHz, and 900 MHz). Available frequency bands with the exception of the 900 MHz band require a license from the Federal Communications Commission (FCC) for permission to operate, and such operation is covered by Part 90 of the FCC rules and regulations. The 450-470 MHz band is authorized for primary use by occasional voice service, on a shared use basis with others in a particular service area. Typical users include taxi dispatch, maintenance and repair dispatch, and other business or government services that need occasional voice service and do not need access to a nationwide telecommunications service.

Most users of available communication channels are required to share the channel with other users. However, users that transmit data such as surveyors typically set up on a work site and start transmitting data packets that are typically broadcast once per second, with a duration of approximately 0.25-0.4 seconds, until the project is complete. Thus, a particular channel is virtually occupied by the transient user until the project is complete. This can create problems for other users, particularly when a radio channel is used for which there is a local area repeater system. If the data packets are picked up by the repeater system, they are rebroadcast over a much larger area. This renders the particular channel completely useless over a large area. Even if the user's signal is not repeated, the user's strong signal may "capture" the repeater's receiver and thereby prevent voice users from using the repeater.

For the above reasons, a channel formerly used by local voice users can become unusable for the entire time period in which data is transmitted. When an established user, at his base of operations, cannot access the user's mobile fleet in a few seconds, his options are few: wait until the channel clears, or reassign each radio in the fleet to a new channel. This is inconvenient and time consuming for the established user. This also can lead to complaints by the local established users to the FCC for failure to abide by the rules of operation established by the FCC that call for sharing the channel.

The FCC requires that voice users listen before they speak to assure that the channel is available. However, in many instances users do not listen for a sufficient amount of time. This often results in voice users talking over a digital data transmitter's transmission. This can result in loss of data. If the voice usage is significant, this may force the user of the digital data transmitter to change to a less congested frequency band.

What is needed is a method and apparatus that will allow for more efficient use of available frequency bands. Also, a method and apparatus is needed that meets the above needs and that does not interfere with voice communication. In addition, a method and apparatus is needed that meets the above needs and that is inexpensive and easy to operate.

DISCLOSURE OF THE INVENTION

The present invention provides an apparatus and method that allows for more efficient use of available frequency bands. The method and apparatus of the present invention provide for communicating or coupling data from a first communication device to a second communication device by transmitting information over unoccupied radio channels. More particularly, the present invention provides a method and apparatus that is inexpensive and easy to operate and that minimizes interference with voice communication.

A first communication device and a second communication device are disclosed that communication data via radio technology. In one embodiment, a present radio communication device transmits over unlicensed frequency bands. (e.g., similar to use in some European Countries). However, alternatively, licensed and/or shared bands could be used also (e.g., similar to some use in the United States).

In operation, a first communication device (e.g., the communication device that is sending data) monitors a radio channel in a predetermined set of radio channels. A message is transmitted on the first radio channel if the first radio channel is unoccupied. A second radio channel from the predetermined set of channels is checked if the first radio channel is occupied. The message is transmitted on the second radio channel if the second radio channel is unoccupied and the message was not sent on the first radio channel. In one embodiment, the transmission is sent in predetermined limited time blocks and a predetermined set of channels that is limited to a particular number of channels. In one embodiment a channel occupancy map and channel selection algorithm are utilized to establish the predetermined set of channels. In one embodiment, a channel with a high noise floor (e.g., a reducing the range) while clear in the sense that others are not using it is still designated as "occupied" because the noise level exceeds a predetermined or desirable amount. In one exemplary implementation, the present invention is utilized in a system that is not a narrow band system.

The method and apparatus of the present invention allows for communication over multiple channels sequentially by moving from channel to channel. By communicating over unoccupied channels, more efficient use of available frequency bands is obtained. In addition, by communicating over unoccupied channels, the method and apparatus of the present invention does not interfere with voice communication. In addition, the method and apparatus of the present invention is inexpensive and easy to operate.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, that are incorporated in and form a part of this specification, illustrate embodiments of the invention and, together with the description, serve to explain the principles of the invention:

FIG. 11 is a diagram illustrating an exemplary assignment of a radio channel or sequence of radio channels using predicted occupancy in accordance with one embodiment of the present claimed invention.

FIG. 13 is a flow chart of an exemplary medium hopping radio transmission method in accordance with one embodiment of the present invention.

FIG. 15 is a flow chart of another exemplary radio transmission method in accordance with one embodiment of the present invention.

Figure 1:
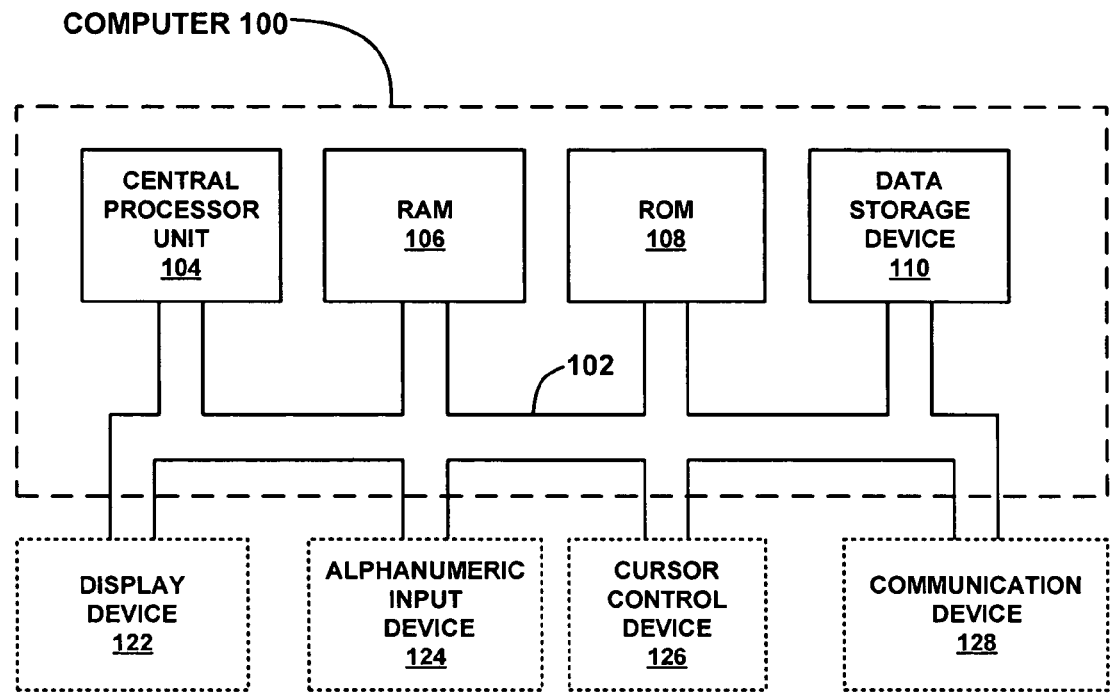
FIG. 1 is a diagram showing an exemplary computer system in accordance with one embodiment of the present invention.

The drawings referred to in this description should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims. Furthermore in the following detailed description of the present invention, numerous specific details are set forth in order to provide a thorough understanding of the present invention. However, it will be obvious to one of ordinary skill in the art that the present invention may be practiced without these specific details. In other instances well-known methods, procedures, components and circuits have not been described in detail as not to unnecessarily obscure aspects of the present invention.

Some portions of the detailed descriptions that follow are presented in terms of procedures logic blocks, processing, and other symbolic representations of operations on data bits within a computer memory. These descriptions and representations are the means used by those skilled in the data Processing arts to most effectively convey the substance of their work to others skilled in the art. In the present application a procedure, logic block, process, etc., is conceived to be a self-consistent sequence of steps or instructions leading to a desired result. The steps are those requiring physical manipulations of physical quantities Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "receiving," "sending," "determining," "inserting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

With reference now to FIG. 1, portions of the present method for sending a message that indicates position and system are comprised of computer readable and computer-executable instructions that reside, for example, in computer-usable media of a computer system. FIG. 1 illustrates an exemplary computer system 100 used to perform the method of coupling a message by radio from a first communication device to a second communication device in accordance with one embodiment of the present invention. It is appreciated that system 100 of FIG. 1 is exemplary only and that the present invention can operate within a number of different computer systems including general purpose networked computer systems, embedded computer systems, and stand-alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. System 100 of the present invention also includes an optional alphanumeric input device 124 including alphanumeric and function keys is coupled to bus 102 for communicating information and command selections to central processor unit 104. System 100 also optionally includes a cursor control device 126 coupled to bus 102 for communicating user input information and command selections to central processor unit 104. System 100 of the present embodiment also includes an optional display device 122 coupled to bus 102 for displaying information.

Referring still to FIG. 1, optional display device 122 of FIG. 1, may be a liquid crystal device, cathode ray tube, or other display device suitable for creating graphic images and alphanumeric characters recognizable to a user. Optional cursor control device 126 allows the computer user to dynamically signal the two dimensional movement of a visible symbol (cursor) on a display screen of display device 122. Many implementations of cursor control device 126 are known in the art including a trackball, mouse, touch pad, joystick or special keys on alphanumeric input device 124 capable of signaling movement of a given direction or manner of displacement. Alternatively, it will be appreciated that a cursor can be directed and/or activated via input from alphanumeric input device 124 using special keys and key sequence commands. The present invention is also well suited to directing a cursor by other means such as, for example, voice commands. A more detailed discussion of the interrupt optimization method and system embodiments of the present invention are found below.

With reference still to FIG. 1, significantly, a communication device 128, coupled to bus 102, is used for transmitting and receiving data. In one embodiment, communication device 128 includes a radio modem. Alternatively, a radio transceiver, a radio transmitter and radio receiver, etc. can be used.

Figure 2:
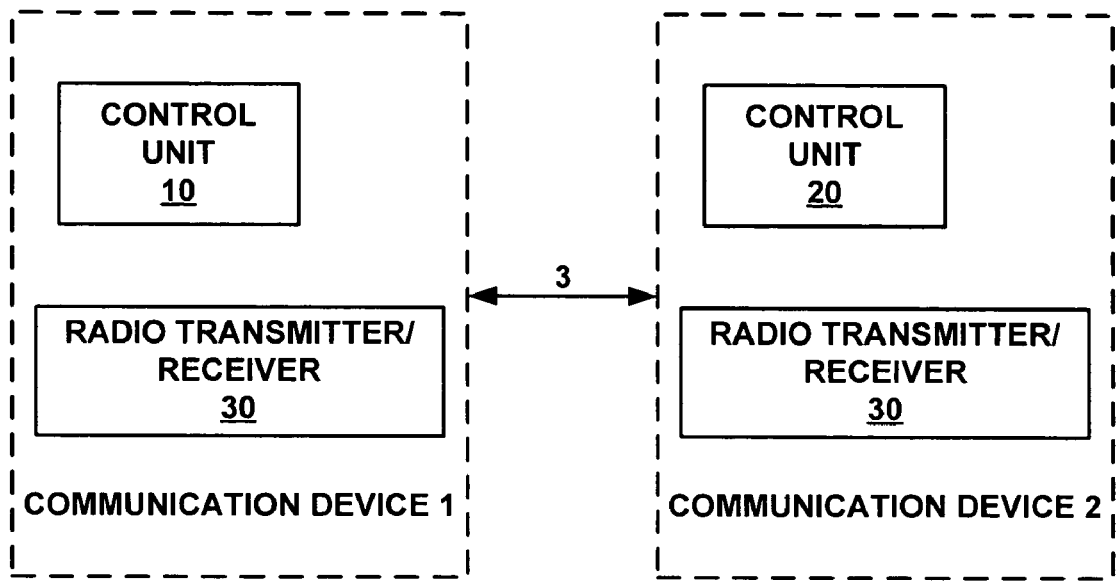
FIG. 2 is a schematic diagram of a system that includes a first communication device and a second communication device in accordance with one embodiment of the present claimed invention.

FIG. 2 shows a communication device 1 that is adapted to communicate with communication device 2. Communication between communication device 1 and communication device 2, indicated by arrow 3, is conducted over licensed or unlicensed radio frequencies.

Communication device 1 of FIG. 2 includes control unit 10 that controls the operations of communication device 1. In one embodiment, control unit 10 is a computer such as computer 100 of FIG. 1. Radio transmitter/receiver 30 of communication device 1 is operable in response to instructions and input from control unit 10 to transmit and receive radio signals.

Communication device 2 of FIG. 2 includes control unit 20 that controls the operations of communication device 2. In one embodiment, control unit 20 is identical to control unit 10 of FIG. 1. Radio transmitter/receiver 30 of communication device 2 is operable in response to instructions and input from control unit 20 to transmit and receive radio signals.

Figure 3:
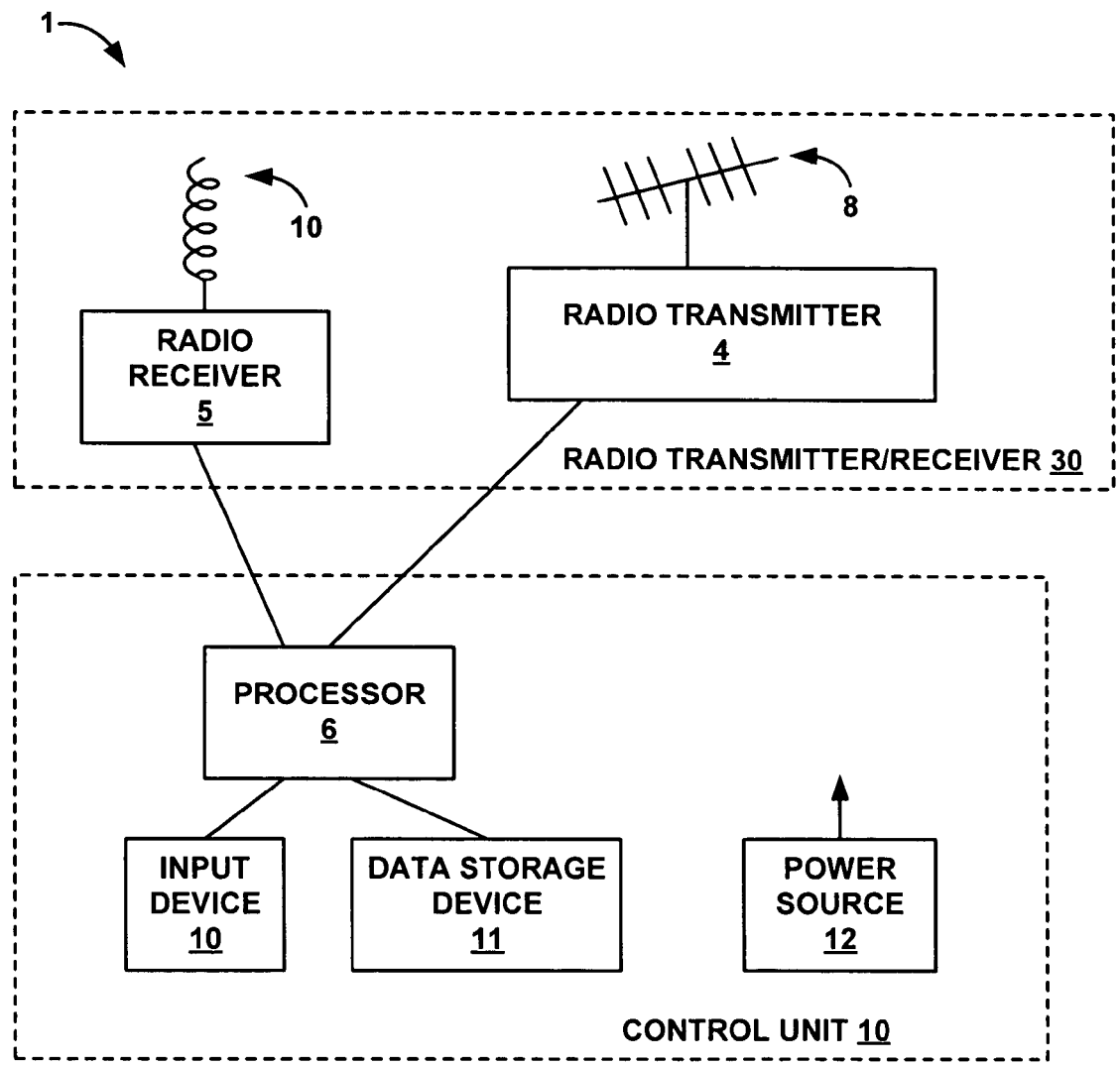
FIG. 3 is a schematic diagram of a first communication device in accordance with one embodiment of the present claimed invention.

FIG. 3 shows an embodiment of communication device 1 in which radio transmitter/receiver 30 includes a separate radio transmitter 4 and radio receiver 5. In one embodiment, radio receiver 5 is a multi-channel scanner that receives radio signals through antenna 10 and radio transmitter 4 transmits radio signals through antenna 8.

Continuing with FIG. 3, in one embodiment, control unit 10 is shown to include a processor 6 that is coupled to radio transmitter 4 and radio receiver 5. In one embodiment, processor 6 is a general-purpose microprocessor that has low power consumption such as for example, a MIPS R4K microprocessor made by Silicon Graphics Inc., of Mountain View, Calif. In one embodiment, a computer program (not shown) operates on processor 6 for controlling the operations of communication device 1. Alternatively processor 6 can be an Application Specific integrated Circuit (e.g., ASIC) device or a Field programmable Gate Array (e.g., a FPGA) device that is programmed to perform the desired functions.

Data storage device 11 of FIG. 3 is coupled to processor 6 and is adapted to store data. Data storage device 11 may be any type of digital data storage medium. In one embodiment data storage device 11 is a Random Access Memory RAM device such as for example, a Static Random Access Memory (SRAM) device, a Dynamic Random Access Memory (DRAM) device or a flash memory storage device.

Continuing with FIG. 3, power source 12 provides power to the various components of communication device 1. Power source 12 may be any power source. In one embodiment, power source 12 includes D cell batteries.

Still referring to FIG. 3, input device 10 can be any device adapted to couple user input to processor 6. In one embodiment, input device 10 is an alphanumeric keypad that includes one or more function keys. However, alternatively, input device 10 could include a touchpad, joystick, mouse, etc that is usable in combination with a visible display for coupling user input to processor 6.

Although radio transmitter/receiver 3 of FIG. 3 is shown to include a separate radio transmitter and radio receiver, alternatively, radio transmitter/receiver 3 could include a radio transceiver that is adapted to both send and receive radio signals.

Figure 4:
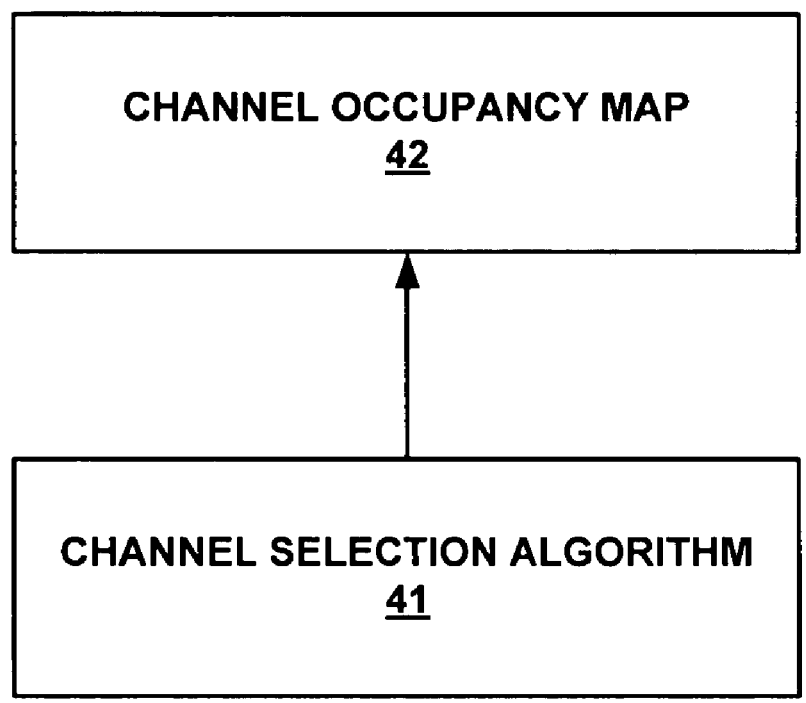
FIG. 4 is a schematic diagram showing a channel occupancy map and a channel selection algorithm in accordance with one embodiment of the present claimed invention.

Referring now to FIG. 4, channel occupancy map 42 indicates the occupancy of radio channels. In one embodiment, channel occupancy map 42 is a data file that is generated by processor 6 of FIG. 3 and that is stored in a data storage device 11 of FIG. 3. Alternatively, channel occupancy map 42 can be stored in data storage registers of processor 6. In an embodiment that includes computer 100 of FIG. 1, channel occupancy map 42 is generated by central processing unit 104 and is stored in volatile memory storage (RAM) 106.

Referring still to FIG. 4, a channel selection algorithm 41 is adapted to determine available channel(s) and assign a radio channel or assign a sequence of radio channels. In one embodiment, channel selection algorithm uses data from channel occupancy map 42 for determining whether radio channels are occupied and for assigning radio channel(s). In one embodiment, channel selection algorithm 41 is an algorithm that is adapted to run on processor 6 of FIG. 3 for determining available channels and for assigning channel(s). In one embodiment, channel selection algorithm 41 is a software program that is stored in data storage device 11 of FIG. 3 that is adapted to run on processor 6 of FIG. 3. Alternatively, when processor 6 of FIG. 3 is an ASIC device or a FPGA device, channel selection algorithm 41 is programmed into processor 6. In an embodiment that includes computer 100 of FIG. 1, channel selection algorithm 41 is stored in non-volatile memory storage (e.g., ROM 106 or on data storage device 110) and operates on central processing unit 104.

Figure 5:
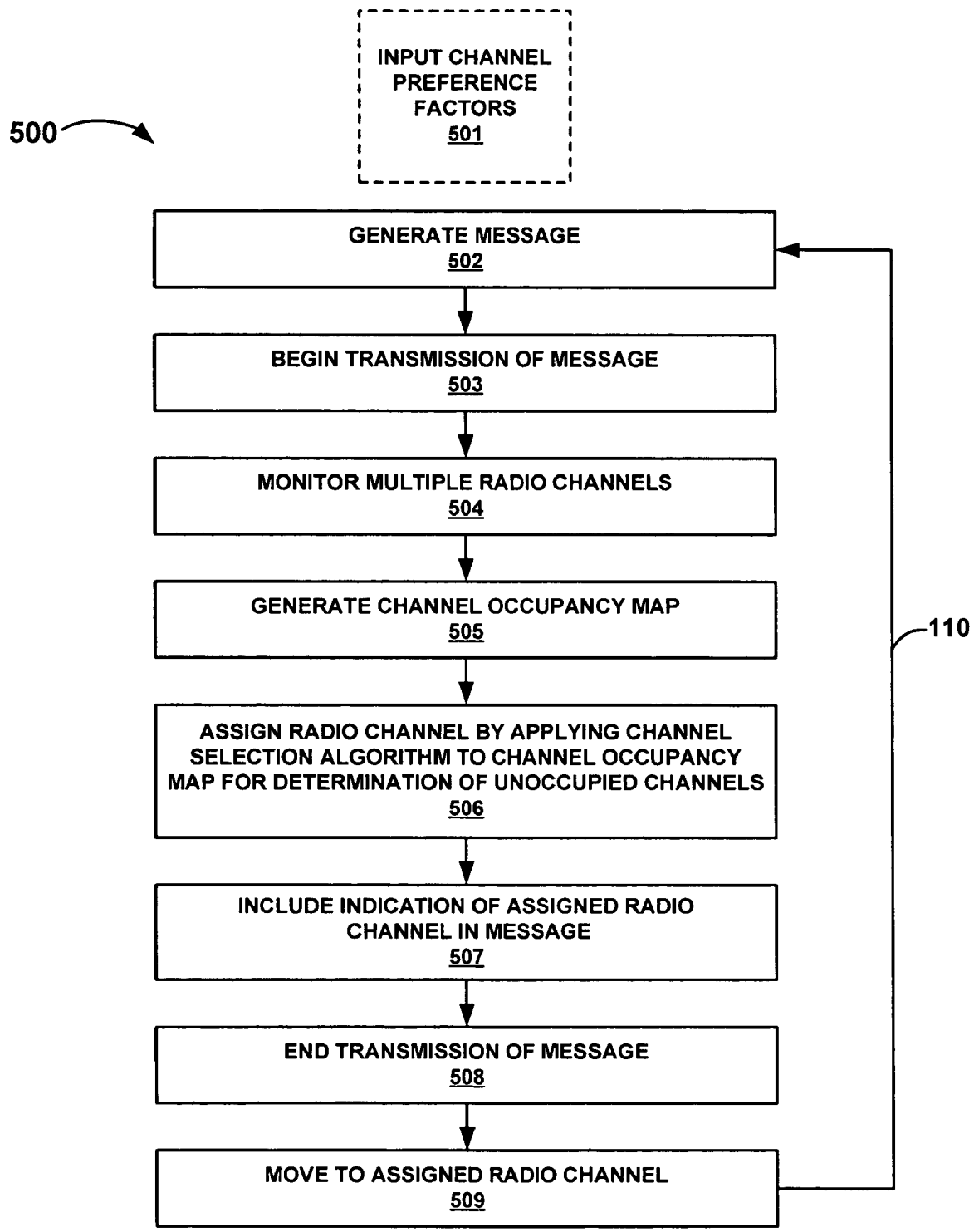
FIG. 5 is a flow chart showing a method for coupling data from a first communication device to a second communication device in accordance with one embodiment of the present claimed invention.

FIG. 5 illustrates a method 500 for coupling a message from a first communication device to a second communication device over unoccupied radio channels. In the foregoing example, communication device 1 of FIG. 1 is described as transmitting messages to communication device 2. However, alternatively, messages may be transmitted from communication device 2 to communication device 1 using the method 500 of FIG. 5.

In one embodiment, channel preference factors can be input as shown by step 501 of FIG. 5. Channel preference factors allow the user to indicate preferred channels and eliminate channels that are not desired. In the embodiment shown in FIG. 3, channel preference factors are input using input device 10.

A message is then generated as shown by step 502 of FIG. 5. In one embodiment, data that is to be transmitted is divided into a message having a predetermined length. In one embodiment, a message having a length that corresponds to a transmission time of between 4 seconds and one second is used.

Continuing with FIG. 5, during the transmission of the message generated in step 502, steps 504-507 are performed.

Continuing with FIG. 5, multiple radio channels are monitored as shown by step 504. In the embodiment shown in FIG. 2, radio transmitter/receiver 30 monitors multiple radio channels to control unit 10 of communications device 1. In the embodiment shown in FIG. 3, radio receiver 5 is operable to monitor radio channels and couple radio traffic to processor 6.

A channel occupancy map is generated as shown by step 505. In the embodiment shown in FIGS. 3-4 channel occupancy map 42 is generated using transmissions received by radio receiver 5. The channel occupancy map 42 indicates the occupancy of monitored radio channels.

Figure 10:
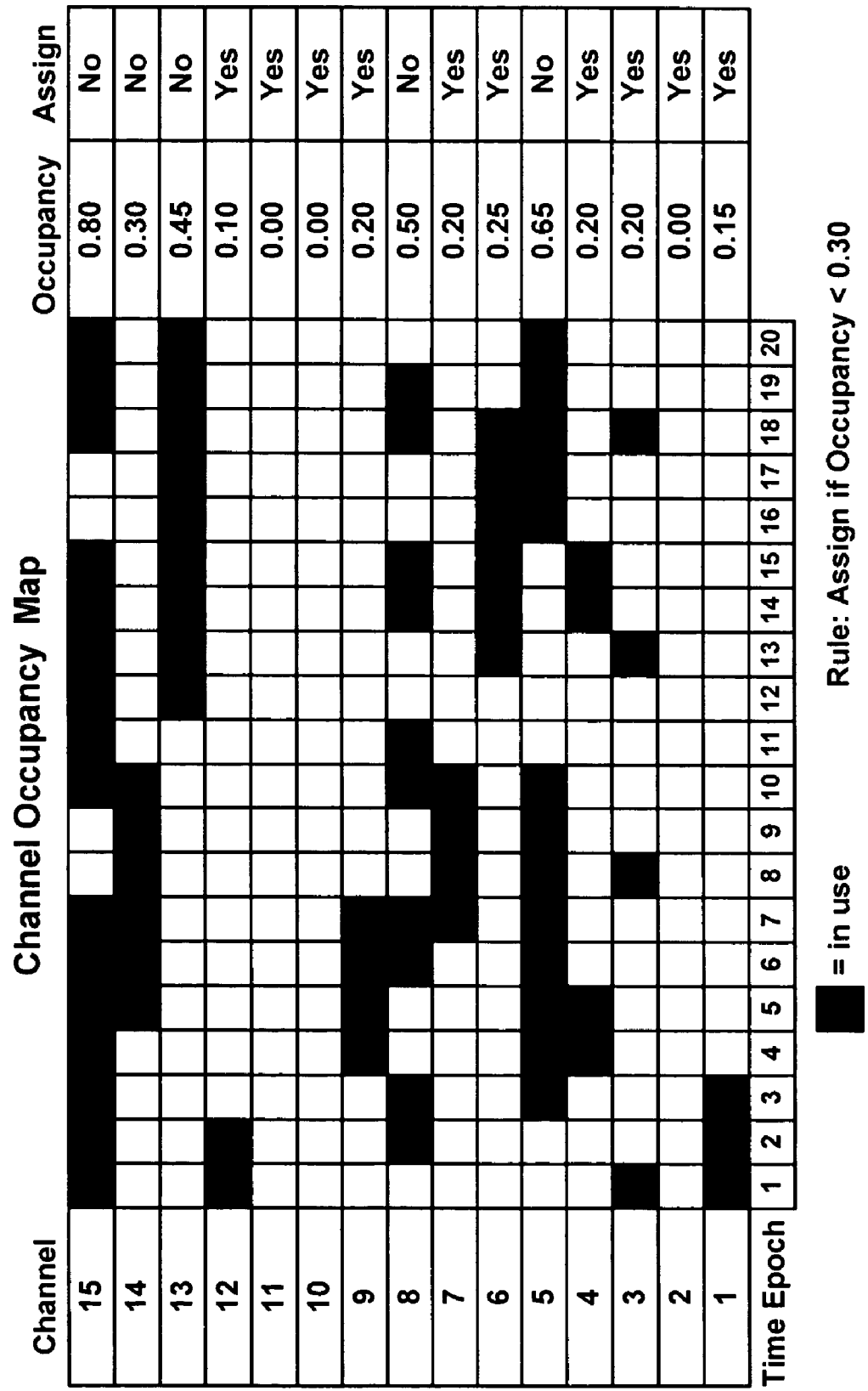
FIG. 10 is a diagram illustrating an exemplary channel occupancy map in accordance with one embodiment of the present claimed invention.

FIG. 10 shows an exemplary channel occupancy map that reflects the occupancy of channels 1-15 over a 20 second time epoch. The occupancy expressed as a percentage for each of channels 1-15 is indicated. For example, channel 15 was determined to be occupied 80 percent of the time. In contrast, channels 2, 10, and 11 have an occupancy of zero percent as a result of no communications being detected during any of the monitored time epochs.

Continuing with FIG. 5, as shown by step 506, the channel selection algorithm is applied to the channel occupancy map for determination of unoccupied channels and the assignment of a radio channel. In one embodiment the channel selection algorithm uses a threshold value for determining whether or not a particular channel is occupied. If the occupancy of a particular channel is less than the threshold value, the channel is determined to be unoccupied.

Referring now to the channel occupancy map of FIG. 10, an exemplary determination of occupancy is shown under the column marked assign. In this example, the threshold value is 30 percent. Thus, those channels that have an occupancy of less than 30 percent are determined to be unoccupied. In this example, channels 1, 2, 3, 4, 6, 7, 9, 10, 11 and 12 are determined to be unoccupied.

Continuing with step 506 of FIG. 5, once a determination is made as to the channels that are unoccupied, a radio channel is assigned from the available unoccupied radio channels. In one embodiment, the first radio channel that is determined to be unoccupied is assigned. Alternatively when a channel preference factor indicates a preferred channel or channels, the first unoccupied preferred channel is selected.

Referring now to step 507 of FIG. 5, an indication of the assigned radio channel is included in the message. In one embodiment, the indication of the assigned radio channel is simply the number of the channel. The number of the channel is included by appending the number of the channel to the end of the message.

Step 508 shows the end of the transmission of the message. After message transmission is completed as shown by step 508, the radio channel is changed to the assigned radio channel. That is, the radio channel is changed to the radio channel assigned in step 506. In the embodiment shown in FIG. 3, processor 6 instructs radio transmitter/receiver 30 to move to the assigned radio channel.

As shown by arrow 110, the process of steps 502-509 is repeated until all of the data has been transmitted. That is, a new message is generated containing the data to be transmitted as shown by step 502 and transmission of the message is initiated as shown by step 503. During the transmission of the message, multiple radio channels are monitored as shown by step 504 and a new channel occupancy map is generated shown by step 505. The channel selection algorithm is applied to the new channel occupancy map for determining channels that are unoccupied and assigning a radio channel. An indication of the assigned radio channel is then included in the message as shown by step 507. After the transmission of the message is complete, as shown by step 508, the radio channel for message transmission is changed to the newly assigned radio channel. This results in a process in which the transmitter moves or "hops" from channel to channel.

Figure 6:
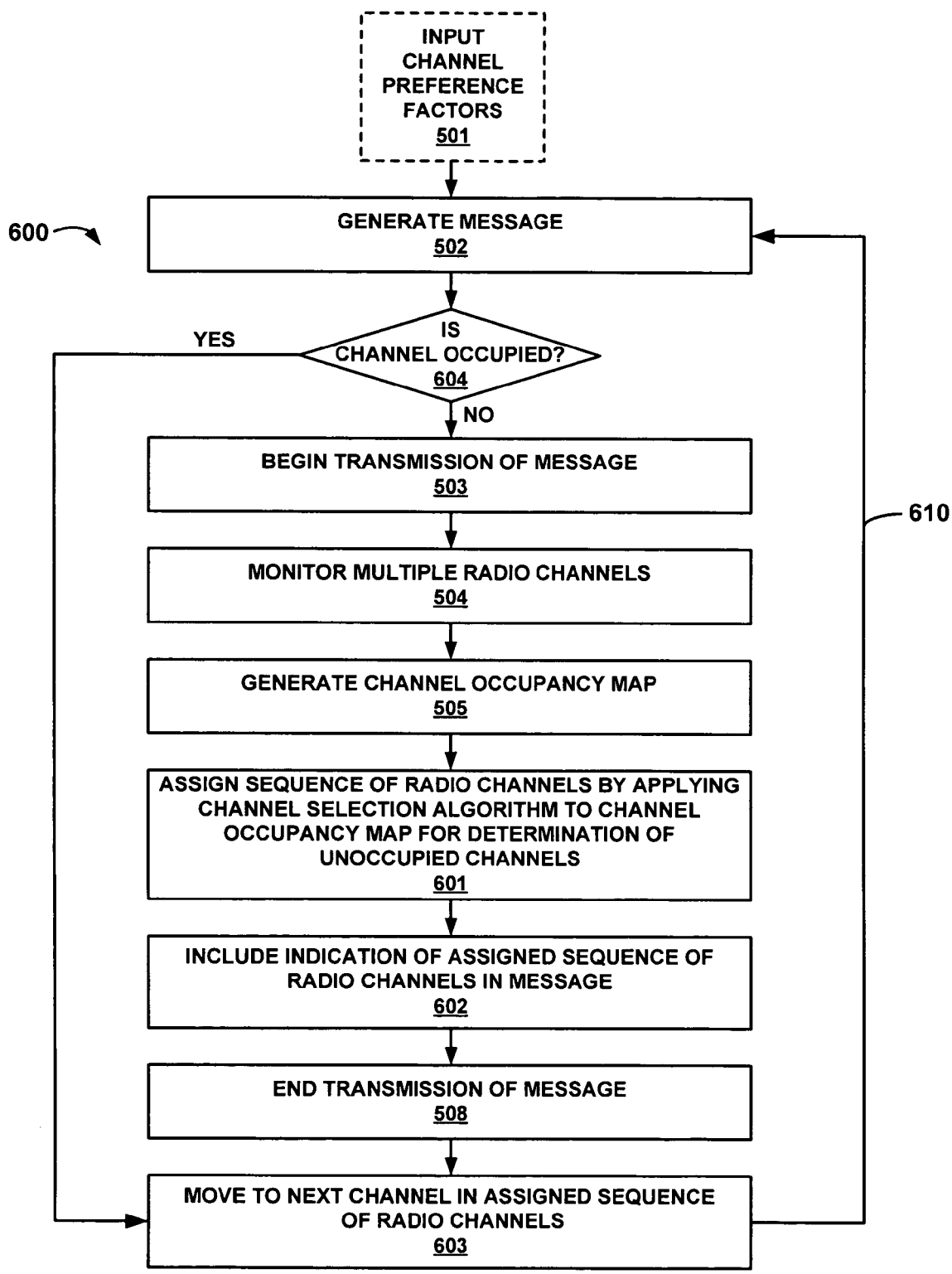
FIG. 6 is a flow chart showing a method for coupling data from a first communication device to a second communication device that includes the assignment of multiple radio channels in accordance with one embodiment of the present claimed invention.

In an alternate embodiment that is shown in flow chart 600 of FIG. 6, multiple radio channels are assigned. First, a message is generated as shown by step 502 of FIG. 6.

In one embodiment, a "last second" listen test is used to assure that all transmissions are over radio channels that are currently not in use. In this embodiment, if channel activity is detected immediately prior to step 503, the scheduled transmission is aborted as shown by optional step 604.

As shown by step 503, transmission of the message generated in step 502 is initiated. In the embodiment shown in FIG. 2, the message is transmitted by transmitter/receiver 30. In the embodiment shown in FIG. 3, radio transmitter 4 transmits the message via antenna 8.

Continuing with FIG. 6, during the transmission of the message generated in step 502, steps 503-505 aid 601-602 are performed. First, multiple radio channels are monitored as shown by step 504 and a channel occupancy map is generated as shown by step 505.

As shown by step 601, a channel selection algorithm is applied to the channel occupancy map for determination of unoccupied radio channels. In one embodiment, the channel selection algorithm uses a threshold value for determining whether or not a particular channel is occupied. If the occupancy of a particular channel is less than the threshold value, the channel is determined to be unoccupied.

Continuing with step 601 of FIG. 6, once a determination is made as to the channels that are unoccupied, a sequence of radio channels are assigned from the available unoccupied radio channels. In one embodiment, the first N radio channels that are determined to be unoccupied are assigned, with N being the number of radio channels in the assigned sequence of radio channels.

Referring now to step 602 of FIG. 6, an indication of the assigned radio channel is included in the message. In one embodiment, the indication of the assigned sequence of radio channels is simply a series of numbers that are appended to the end of the message.

Step 508 shows the end of the transmission of the message. After message transmission is completed, the radio channel is changed to the next radio channel in the assigned sequence of radio channels as shown by step 603.

As shown by arrow 610, the process of steps 502-505, 508 and 601-604 is repeated until all of the data has been transmitted. That is, a new message is generated as shown by step 502 and transmission of the message is initiated as shown by step 503. During the transmission of the message, multiple radio channels are monitored as shown by step 504 and a new channel occupancy map is generated as shown by step 505. As shown by step 601, the channel selection algorithm is applied to the channel occupancy map for determining channels that are unoccupied and a sequence of radio channels are assigned. As shown by step 602, an indication of the assigned sequence of radio channels is then included in the message. After the transmission of the message is complete, the process moves or "hops" to the next radio channel in the assigned sequence of radio channels as shown by step 603.

In one embodiment a sequence of 30 radio channels is assigned with each message transmitted according to the previously assigned sequence of radio channels. In one embodiment, 30 radio channels are assigned for each thirty second time period and transmissions are initiated at the beginning of each second. This gives a series of 30 radio channels for each thirty-second time period, with one channel assigned to each second.

Figure 7:
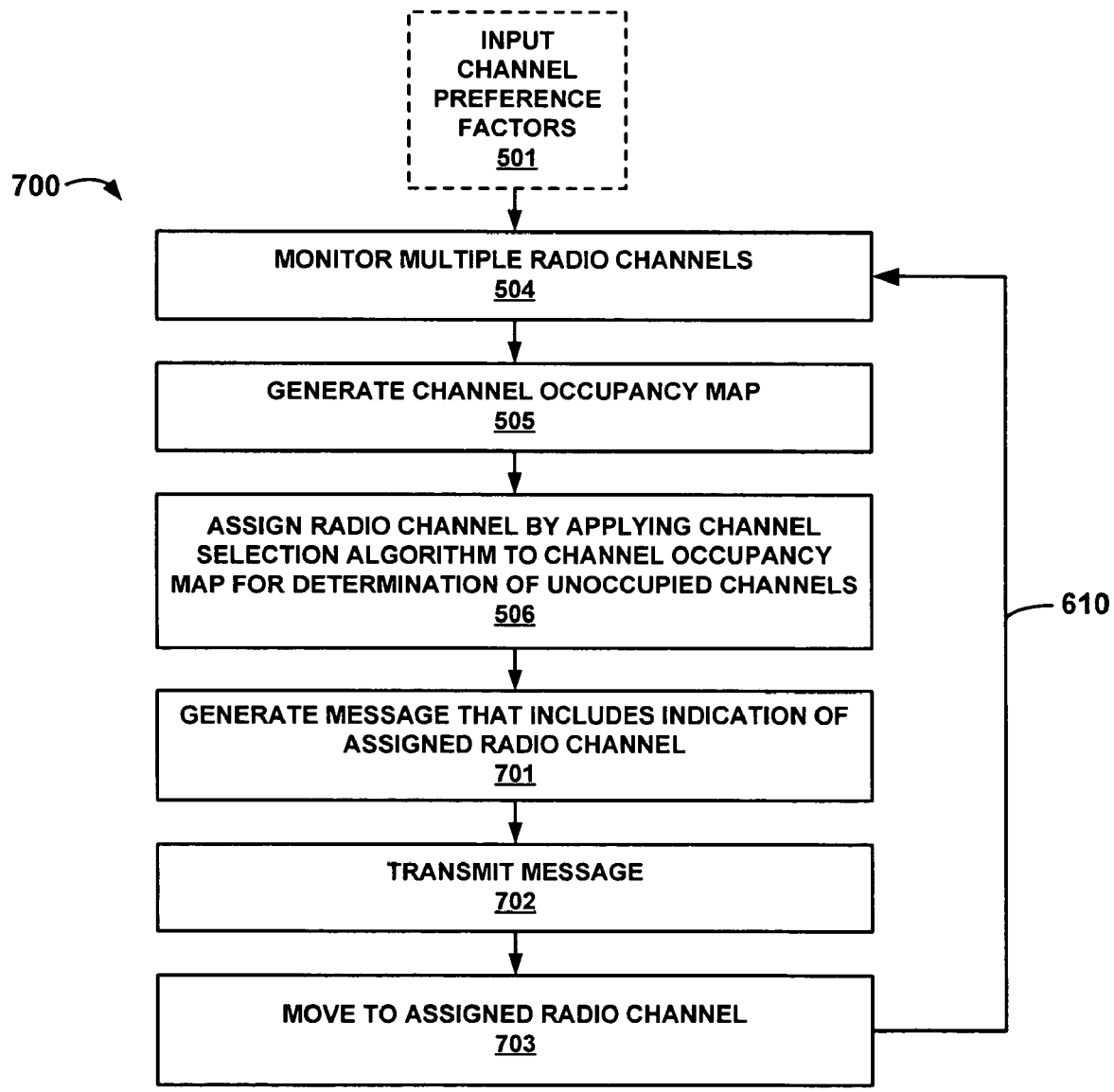
FIG. 7 is a flow chart showing a method for coupling data from a first communication device to a second communication device in accordance with one embodiment of the present claimed invention.
Figure 8:
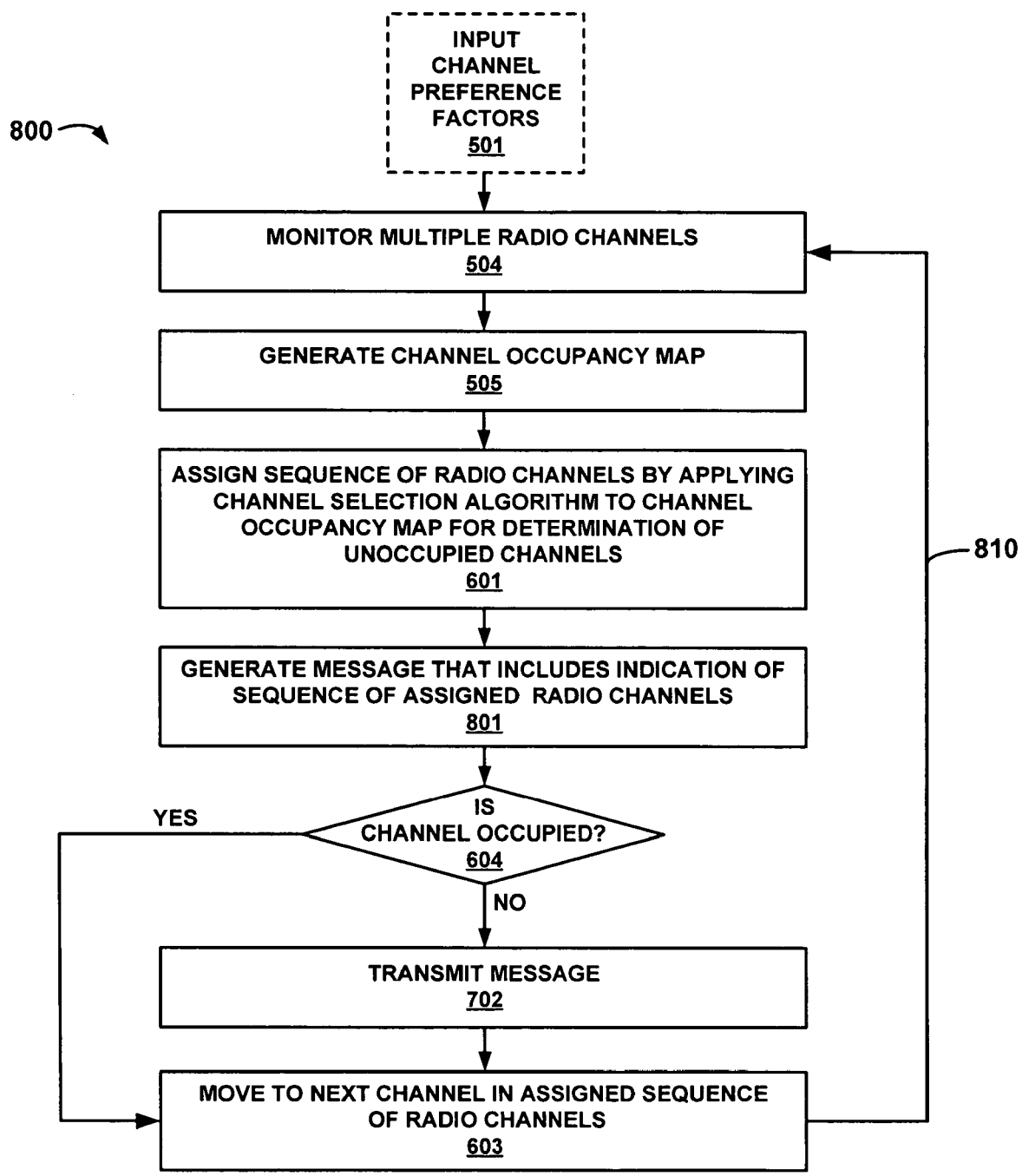
FIG. 8 is a flow chart showing a method for coupling data from a first communication device to a second communication device that includes the assignment of multiple radio channels in accordance with one embodiment of the present claimed invention.

In an alternate embodiment that is shown in FIG. 7-8, the assigned radio channel or sequence of radio channels is updated between transmissions of messages. That is, messages are transmitted at intervals, with a time delay between subsequent transmissions sufficient for performing steps 504-507.

Referring now to FIG. 7, channel preference factors can be input as shown by optional step 501. Along with channel preference factors, a home channel can be input. Alternatively, a predetermined (default) home channel is used.

Continuing with FIG. 7, multiple radio channels are monitored as shown by stop 504, a channel occupancy map is generated as shown by step 505, the channel selection algorithm is applied to the channel occupancy map for determining a channel that is unoccupied and a radio channel is assigned as shown by step 506.

A message is generated as shown by step 701 of FIG. 7 that indicates the assigned radio channel. That is, in one embodiment, the data that is to be transmitted is included in a message that indicates the assigned radio channel. In one embodiment, the indication of the assigned radio channel is the number of the assigned radio channel that is inserted at the end of the message.

The message is then transmitted as shown by step 702. The radio channel is then moved to the assigned radio channel as shown by step 703. More particularly, the radio channel of the transmitter is moved to the assigned radio channel.

Continuing with FIG. 7, the process of steps 504-506 and 701-703 is repeated as shown by arrow 610 until all of the data has been transmitted. That is, multiple radio channels are monitored as shown by step 504 and a new channel occupancy map is generated as shown by step 505. As shown by step 506, the channel selection algorithm is applied to the new channel occupancy map for determining a channel that is unoccupied and assigning a new radio channel As shown by step 701, a new message is generated that includes an indication of the newly assigned radio channel which is then transmitted as shown by step 702. The transmitter is then moved to the newly assigned radio channel as shown by step 703.

In the embodiment shown in FIG. 8, multiple channels are assigned so as to obtain an assigned sequence of radio channels. As in the previous embodiments, channel preference factors can be input as shown by optional step 501. Along with channel preference factors, a home channel can be input. Alternatively, a predetermined (default) home channel is used.

Continuing with FIG. 8, multiple radio channels are monitored as shown by step 504 and a channel occupancy map is generated as shown by optional step 505. As shown by step 801, the channel selection algorithm is applied to the channel occupancy map for determining channels that are unoccupied and assigning a sequence of radio channels.

A message is generated as shown by step 801 that indicates the assigned radio channel. That is, in one embodiment the data that is to be transmitted is included in a message that indicates the assigned radio channel. In one embodiment, the indication of the assigned radio channel is the number of the assigned radio channel that is inserted at the end of the message.

In one embodiment, a "last second" listen test is used to assure that all transmissions are over radio channels that are currently not in use. In this embodiment, if channel activity is detected immediately prior to step 702, the scheduled transmission is aborted as shown by optional step 604. Otherwise, the message is transmitted as shown by step 702.

The radio channel is then moved to the assigned radio channel as shown by step 603. More Particularly, the radio channel of the transmitter is moved to the to the next radio channel in the assigned sequence of radio channels.

Continuing with FIG. 8, the process of steps 504-505, 601, 603-604, 702 and 801 is repeated as shown by arrow 810 until all of the data has been transmitted. That is, multiple radio channels are monitored as shown by step 504 and a new channel occupancy map is generated as shown by step 505. As shown by step 601, the channel selection algorithm is applied to the channel occupancy for determining channels that are unoccupied and a new sequence of radio channels is assigned. As shown by step 801, a new message is generated that includes an indication of the newly assigned sequence of radio channels. The new message is transmitted as shown by step 702 when the radio channel over which the transmission is to occur is not occupied immediately prior to the transmission as shown by step 604. The transmitter is then moved to the newly assigned radio channel as shown by step 603.

In one embodiment, transmissions shown by step 503 and 508 of FIGS. 5-6 and step 702 of FIGS. 7-8 are synchronized and each transmission begins at the beginning of each second. In one embodiment, the first message is transmitted over a home channel and all subsequent messages are transmitted over an assigned radio channel. Thus, the methods of FIGS.

5-8 generate a series of messages that include an indication of an assigned radio channel or assigned sequence of radio channels.

Method 600 of FIG. 6 and Method 800 of FIG. 8 provide for the generation of sequences of assigned radio channels. This allows the receiving communication device to operate independently from the time that a sequence of radio channels is received until such time that a new sequence is transmitted This method provides for a more reliable link between the sending communication device and the receiving communication device because the failure to receive a single transmission will likely not result in a loss of connection. That is, because a sequence of radio channels is transmitted, updates to the sequence can be obtained by a receiving communication device prior to the "hop" to a new sequence of assigned radio channels. This results in multiple opportunities for communication of updates to the sequence before the sending communication device moves to the newly assigned sequence of channels.

Referring now to FIGS. 6 and 8, the "last second listen test" or the current status of the channel (e.g., in the case of a medium hopping implementation) are shown in step 604 results in aborted transmissions when channel activity is detected. However, since transmissions are initiated each second, the abortion of a single transmission does not significantly affect the operation of the system. Yet, by monitoring the channel and aborting transmission when radio traffic is detected, the method and apparatus of the present invention does not walk over other radio traffic.

Figure 9:
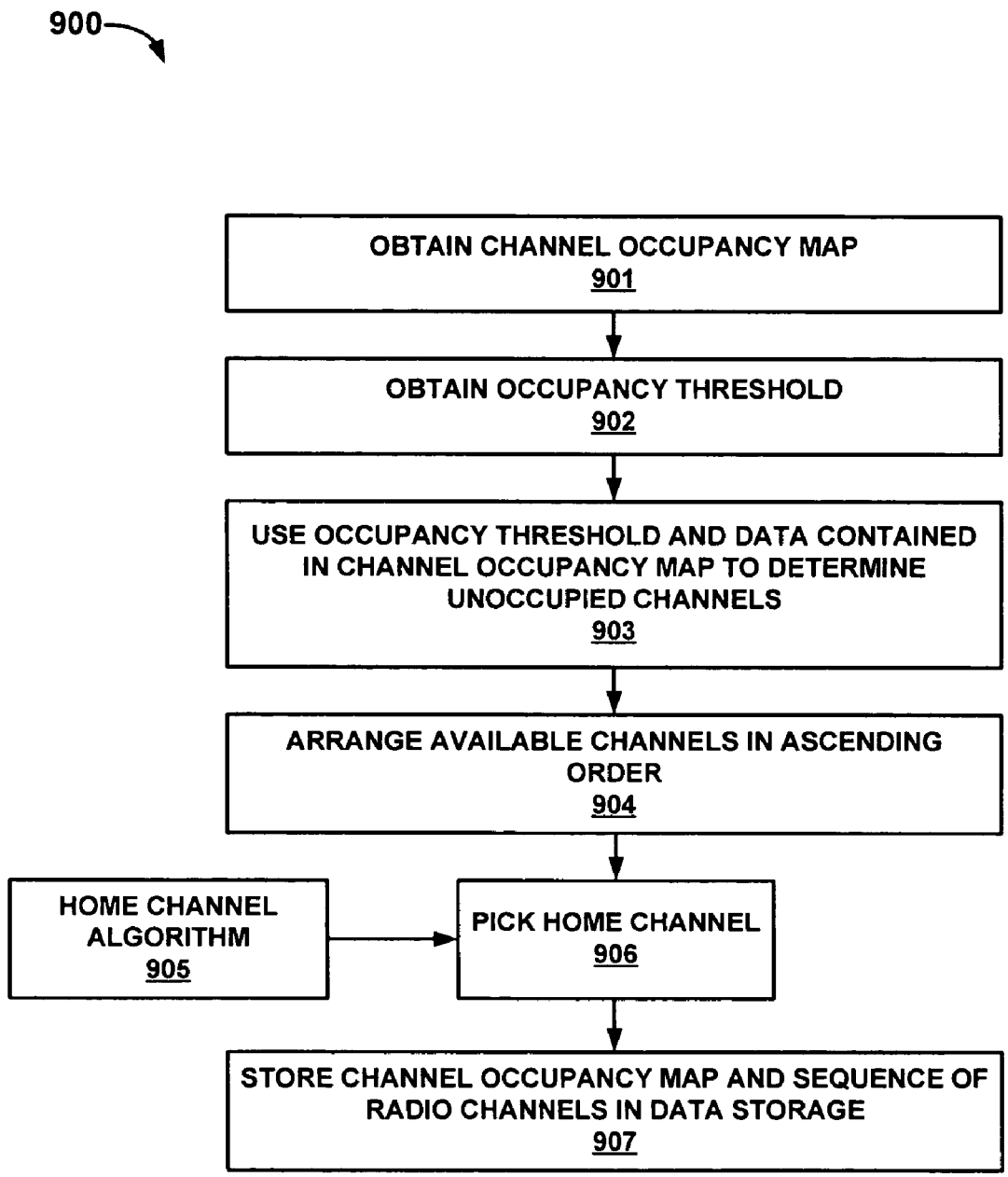
FIG. 9 is a diagram illustrating an exemplary channel selection process using a channel selection algorithm in accordance with one embodiment of the present claimed invention.

FIG. 9 shows flow chart 900 for selecting a sequence of unoccupied radio channels in accordance with one embodiment of the present invention. As shown by step 901 a channel occupancy map is obtained, In one embodiment, the channel occupancy map is obtained by retrieving, from memory storage, the data representing the channel occupancy map.

Continuing with FIG. 9, as shown by step 902, an occupancy threshold is obtained. In one embodiment, when an Occupancy threshold is input as a channel preference factor in step 501 of FIG. 8, the occupancy threshold is stored in memory storage. Alternatively, a default channel occupancy threshold that is stored in memory storage is used. In either event, the desired occupancy threshold is obtained.

As shown by step 903, the occupancy threshold is applied to the data in the occupancy map to determine channels that are unoccupied. Then, as shown in step 904, channels that are determined to be unoccupied in step 903 are organized in ascending order. That is, the channels are organized from the lowest channel number to the highest channel number.

Continuing with FIG. 9, a home channel algorithm 905 is used to pick a home channel, as shown by step 906. In one embodiment, the home channel is selected by picking the channel having the lowest channel occupancy in the last measurement period. Alternatively, the home channel is selected by picking the lowest channel number of those channels that are determined to be unoccupied That is, in one embodiment, the first channel in the sequence of radio channels obtained from step 904 is designated as the home channel.

Continuing with FIG. 9, the channel map is then stored as the "current map" in data storage and the sequence of radio channels obtained from step 904 is then stored in memory storage as shown by step 907. In one embodiment the sequence of radio channels obtained from step 904 is stored in a storage registers designated as "TEMP STORAGE".

A determination of channel occupancy and assignment of a radio channel or sequence of radio channels can be performed using any of a number of different methods In one embodiment a channel selection algorithm is utilized that uses channel exclusion That is, once it is determined that a particular channel is occupied, that channel is excluded from the selection process for a predetermined time interval. In one embodiment, the channel selection algorithm excludes channels on which Voice usage is detected for a time period of 5 to 20 seconds. This avoids transmission interruptions from voice users in congested areas, Particularly when the same channel is used by multiple voice users.

In yet another embodiment (not shown), the channel selection algorithm determines channel occupancy based on the following factors: local repeater frequencies; regulatory regions; received signal strength indicators of voice transmissions; squelch outputs and squelch levels of voice transmissions; and statistical measures of signal (or noise) measurements.

In one embodiment, predicted channel occupancy is used for assigning a radio channel or sequence of radio channels. Predicted occupancy indicates, in Percentage terms, the likelihood of voice transmission being initiated either prior to or during the subsequent message transmission Radio channels are assigned that are determined not to be occupied and that have a low predicted channel occupancy.

In one embodiment a probability density model is constructed by scanning all the channels and assigning a predicted occupancy for each channel for 1-second, 5-second, and 10-second time periods. This gives an indication as to whether each channel will be occupied during the subsequent transmission that corresponds to the current channel assignment.

One simple method for determining a predicted occupancy for each channel uses the complement of occupancy as an indication of predicted occupancy. In this embodiment, the Percentage occupancy is determined for each channel during the period that the channel is monitored. The Percentage occupancy is subtracted from one to obtain the complement. Channels are then chosen that have a complement that is less than or equal to a predicted occupancy threshold. In one embodiment, a predicted occupancy threshold of 5 is used. FIG. 11 shows an example in which ten channels are scanned, shown in row 1101 as channels 1-10. In this example, occupancy of each channel is shown as a Percentage in row 1102. Row 1103 shows the corresponding complement for each of channels 1-10. When a predicted occupancy threshold of 5 is used, only channels 1-3, 5, 7, and 10 can be chosen as assigned channels as is shown in row 1104.

In one embodiment a predetermined maximum consecutive assignment value is used in conjunction with predicted occupancy for channel assignment. The number of times that a particular channel is consecutively assigned is determined and is compared with the maximum consecutive assignment value. When the number of times that a particular channel is consecutively assigned equals the maximum consecutive assignment value, the particular channel is not assigned. Rather, the next sequential channel that is indicated by the probability density model is assigned. This keeps the method and apparatus of the present invention moving from channel to channel, preventing excessive use of any particular channel.

In an alternate embodiment channel occupancy maps are saved and used during subsequent periods for facilitating channel assignments. In one embodiment, if an evaluation of prior channel occupancy maps determines that the voice occupancy does not change much in a given area over a given time period, a hopping sequence is created for that time period and is used during each subsequent time period. The time period used may be, for example daily, or hourly. The created hopping sequence is then perfected using a statistical usage model. For example, if voice usage picks up each afternoon on one or more channels, the hopping sequence is modified using the statistical usage model. The modified hopping sequence can then be used in subsequent time periods. In one embodiment, the method and apparatus of the present invention generates a daily statistical usage model on the first day of use in a particular area. In one embodiment, the daily statistical usage model is then used for generating hopping sequences for subsequent days, and is perfected by updates to the statistical usage model during the entire time that the first communication device is used in a particular location.

Figure 12:
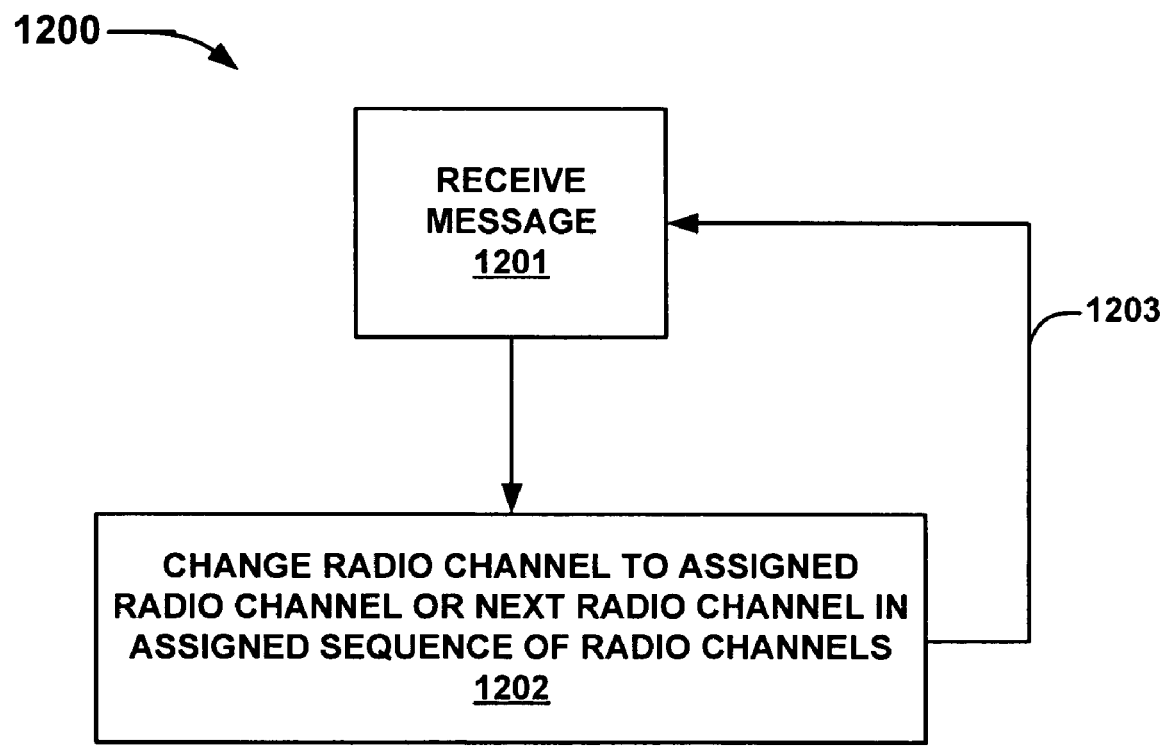
FIG. 12 is a flow chart showing a method for coupling data from a first communication device to a second communication device that shows the steps performed by the receiving communication device in accordance with one embodiment of the present claimed invention.

As shown by flow chart 1200 of FIG. 12, the receiving communication device receives each message as shown by step 1201. In the embodiment shown in FIG. 2, communication device 2 is the receiving communication device.

As shown by step 1202, after each message is received, the receiving communication device changes the radio channel to the assigned radio channel or the next radio channel in the sequence of radio channels. That is, when a transmitting communication device indicates a single assigned radio channel as shown in the embodiments of FIGS. 5 and 7, the receiving communication device changes the radio channel to the assigned radio channel. When the transmitting communication device indicates a assigned sequence of radio channels, the receiving communication device changes the radio channel to the next radio channel in the assigned sequence of radio channels. This process is repeated as shown by line 1203, resulting in the receiving communication device following the movement of the transmitting communication device by moving from channel to channel to receive subsequent messages.

In an embodiment in which the listen before transmit feature is used such as is shown in FIGS. 6 and 8, when a message has not been received in a predetermined amount of time, the receiving communication device automatically moves to the next channel in the sequence of radio channels. This corresponds to a response of "no" in step 604 of FIGS. 6 and 8 and results in the receiving communication device continuing to follow the channel changes of the sending communication device.

FIG. 13 is a flow chart of medium hopping radio transmission method 1300, in accordance with one embodiment of the present invention. Medium hopping radio transmission method 1300 a medium paced automated hopping between radio channels while still ensuring that likelihood of causing interference with other communications on a communication channel is minimized. In one embodiment, the frequency of listening to a given radio channel is faster than a slow hop approach. In one exemplary implementation the frequency of checking for pre-existing use on a radio channel is 0.1 seconds. In the present example, the duration of the data packet transmission is set to 0.25 seconds.

It is appreciated that the present medium hopping radio transmission systems and methods are well suited to communicating a variety of information. For example, the present medium hopping radio transmission systems and methods can be utilized to communicate RTK rover information.

In step 1310, radio transmissions are checked on a first radio channel from a predetermined set of radio channels. In one embodiment, the existence of transmissions on a radio channel indicates the radio channel is currently occupied and unavailable for other use. In one embodiment, the predetermined set of channels is limited to a particular number of channels. In one exemplary implementation, the predetermined set of channels is limited to 4 channels.

In 1320, a message is transmitted on the first radio channel if the first radio channel is unoccupied. It is appreciated that the message can be associated with a variety of different applications and content. In one exemplary implementation, the message is associated with a location (e.g., for use in surveying).

Radio transmissions on a second radio channel from the predetermined set of channels are checked in step 1330 if the first radio channel is occupied. In one embodiment of the present invention the order of selection of the second radio channel is also predetermined within the set of predetermined channels.

In step 1340, the message is transmitted on the second radio channel if the second radio channel is unoccupied and the message was not sent on the first radio channel. It is appreciated that the message can be partially sent on the first radio channel and partially sent on the second radio channel.

In one embodiment, the transmission of the messages is sent in predetermined limited time blocks. For example, the message can be sent in a 0.25 second blocks while checking for other communications on the channel for 0.1 seconds after each 0.25 data burst. It is appreciated that timing constraints of the present medium hopping radio communication systems and methods can be coordinated with a variety of other application timing issues. For example, the timing of message transmissions and the frequency of channel hopping can be coordinated with durations of RTK rover position data transmissions (e.g., 1 second).

It is appreciated that the steps of radio transmission method 1300 can be implemented repeatedly. For example, radio transmission method 1300 can loop back to each transmission channel in the predetermined set of channels until the message is completely sent. Radio transmission method 1300 is described in terms of a first and second channel so as not to obscure the invention. It is appreciated that radio transmission method 1300 can be implemented over a wide variety of channels. For example, check radio transmissions on a third channel and transmit on the third channel if not occupied, check radio transmission of a fourth channel and transmit on the fourth channel if not occupied etcetera. In addition, steps 1310 through 1340 can be repeated such that subsequent message blocks are transmitted over unoccupied radio channels.

The number of cycles of repeating 1310 through 1320 for each particular message block can be limited to a predetermined number of cycles. Limiting the number of cycles through a set of predetermined channels can prevent endless looping through channels that do not offer sufficient available bandwidth within acceptable time periods. In one embodiment, further checking of channels is ceased and an indication is forwarded to a user that the predetermined number of cycles is reached. The user can reinitiate the checking of channels if a user reset indication is received.

In one embodiment of the present invention a base channel is designated. It is appreciated that the base channel can be implemented to have a variety of attributes and/or provide various functionality. In one exemplary implementation the channel designated as the base channel does not change and can be utilized as a default channel to return to if communications become unsynchronized. The base channel can also be returned to if a particular message duration has expired. For example, if an RTK rover communication is not successfully transmitted in 1 second the system can automatically return to the base channel as a default. The base channel can also be utilized to coordinate with legacy equipment that is not capable of changing channels. The base channel can be utilized to communicate various metadata (e.g., identify channels included in the predetermined set, a user reset is initiated, etc.)

Figure 14:
FIG. 14 is a flow chart of an exemplary radio transmission method in accordance with one embodiment of the present invention.

FIG. 14 is a flow chart of radio transmission method 1400, in accordance with one embodiment of the present invention.

In step 1410, a channel occupancy map is utilized to establish a set of radio channels. In one embodiment, channel preference factors are received. A channel selection algorithm and the channel preference factors are applied to the channel occupancy map for determining an assigned sequence of radio channels to be included in the set of radio channels. In one exemplary implementation, the channel selection algorithm uses the complement of a percentage occupancy of each radio channel for assigning the sequence of radio channels. It is appreciated radio channels over which a transmission is detected can be excluded from the selection process for a predetermined amount of time. In one embodiment, the channel selection algorithm uses predicted occupancy for assigning a sequence of radio channels.

In step 1420 a medium hopping radio transmission process is performed. In one embodiment, the medium hopping radio transmission process is similar to medium radio transmission method 1300. In one exemplary implementation, channels in a predetermined set of channels are checked and a message is sent on a channel if the channel is not occupied.

In one embodiment, cycles of repeating the steps for each particular message block is limited to a predetermined number of cycles. In addition, a channel selection algorithm is applied for determining a new assigned sequence of radio channels to replace the set of radio channels if the predetermined number of cycles is reached. In one exemplary implementation, a message is discarded if not successfully transmitted within a certain number of cycles and an attempt is made to transmit a subsequent message.

FIG. 15 is a flow chart of radio transmission method 1500 in accordance with one embodiment of the present invention. In one embodiment of radio transmission method 1500, devices automatically jump and check radio channels from a predetermined set of radio channels in a synchronized fashion.

In step 1510, a plurality of communication devices are synchronized to a first radio channel from a predetermined set of radio channels. In one embodiment, the first radio channel is a base channel.

In step 1520, radio transmissions are checked on the first radio channel. In one embodiment, radio transmissions are checked similar to step 1310 of medium hopping radio transmission method 1300 shown in FIG. 13.

With reference again to FIG. 15, the message is transmitted on the first radio channel from a first communication device included in the plurality of communication device in step 1530 if the first radio channel is unoccupied.

In step 1540, the plurality of communication devices change in unison to a second radio channel from the predetermined set radio channels if the first radio channel is occupied. In one embodiment of the present invention, the plurality of radio communication devices change in predetermined epoch time intervals. The time intervals can be similar to the time intervals utilized in medium hopping radio transmission method 1300.

At block 1550, radio transmissions on the second radio channel are checked.

At block 1560, the message is transmitted on the second radio channel if the second radio channel is unoccupied and the message was not sent on the first radio channel.

In one embodiment, the message is received at a second communication device. In one exemplary implementation, the message includes information on the assigned radio channel. The information can be used to change the radio channel of the second communications device to the assigned radio channel.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A medium hopping radio transmission method comprising:
 a) checking for radio transmissions on a first radio channel from a predetermined set of radio channels, said predetermined set of radio channels based upon a set of channel preference factors;
 b) transmitting a message on said first radio channel if said first radio channel is unoccupied;
 c) checking for radio transmissions on a second radio channel from said predetermined set of channels if said first radio channel is occupied; and
 d) transmitting said message on said second radio channel if said second radio channel is unoccupied and said message was not sent on said first radio channel.

2. The medium hopping radio transmission method of claim 1 wherein said transmission is sent in predetermined limited time blocks.

3. The medium hopping radio transmission method of claim 1 wherein said predetermined set of channels is limited to a particular number of channels.

4. The medium hopping radio transmission method of claim 1 further comprising looping back to each of transmission channel in said predetermined set of channels until said message is completely sent.

5. The medium hopping radio transmission method of claim 1 further comprising repeating a) through c) such that subsequent message blocks are transmitted over unoccupied radio channels.

6. The medium hopping radio transmission method of claim 5 wherein cycles of repeating a) through c) for each particular message block is limited to a predetermined number.

7. The medium hopping radio transmission method of claim 6 further comprising: ceasing further checking of channels if said channels are occupied for more than a predetermined number of cycles.

8. The medium hopping radio transmission method of claim 7 further comprising: forwarding an indication to a user that said predetermined number of cycles is reached.

9. The medium hopping radio transmission method of claim 8 further comprising reinitiating said checking of channels if a user reset indication is received.

10. A radio transmission method comprising:
 a) utilizing a channel occupancy map to establish a set of radio channels;
 b) checking for radio transmissions on a first radio channel from said set of radio channels;
 c) transmitting a message on said first radio channel if said first radio channel is unoccupied;

d) checking for radio transmissions on a second radio channel from said set of channels if said first radio channel is occupied; and e) transmitting said message on said second radio channel if said second radio channel is unoccupied and said message was not sent on said first radio channel.

11. The radio transmission method of claim 10 wherein said message is sent in predetermined limited time blocks and said set of radio channels is limited to a particular number of channels.

12. The radio transmission method of claim 10 further comprising:

receiving channel preference factors; and applying a channel selection algorithm and said channel preference factors to said channel occupancy map for determining an assigned sequence of radio channels to be included in said set of radio channels.

13. The radio transmission method of claim 12 wherein said channel selection algorithm uses the complement of a percentage occupancy of each radio channel for assigning said sequence of radio channels.

14. The radio transmission method of claim 12 further comprising excluding radio channels over which a transmission is detected from the selection process for a predetermined amount of time.

15. The radio transmission method of claim 12 wherein said channel selection algorithm uses predicted occupancy for assigning a sequence of radio channels.

16. The radio transmission method of claim 12 further comprising repeating b) through e) such that subsequent message blocks are transmitted over unoccupied radio channels, wherein cycles of repeating b) through e) for each particular message block is limited to a predetermined number of cycles.

17. The radio transmission method of claim 16 further comprising applying a channel selection algorithm for determining a new assigned sequence of radio channels to replace said set of radio channels if said predetermined number of cycles is reached.

18. A radio transmission method comprising:

a) synchronizing a plurality of communication devices to a first radio channel from a predetermined set of radio channels, said predetermined set of radio channels based upon a set of channel preference factors;

b) checking for radio transmissions on said first radio channel;

c) transmitting a message on said first radio channel from a first communication device included in said plurality of communication device if said first radio channel is unoccupied;

d) changing said plurality of communication devices in unison to second radio channel from said predetermined set radio channels;

e) checking for radio transmissions on a second radio channel from said predetermined set of channels if said first radio channel is occupied; and f) transmitting said message on said second radio channel if said second radio channel is unoccupied and said message was not sent on said first radio channel.

19. A radio transmission method of claim 18 further comprising:

g) receiving said message at a second communication device; and h) changing the radio channel of said second communications device to said assigned radio channel.

20. The radio transmission method of claim 18 wherein said transmission is sent in predetermined limited time blocks.

21. The radio transmission method of claim 18 wherein said predetermined set of channels is limited to a particular number of channels.

* * * * *

UNITED STATES PATENT AND TRADEMARK OFFICE
CERTIFICATE OF CORRECTION

PATENT NO. : 7,580,389 B2  Page 1 of 1
APPLICATION NO. : 11/499326
DATED : August 25, 2009
INVENTOR(S) : Kirk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Fourteenth Day of September, 2010

David J. Kappos
*Director of the United States Patent and Trademark Office*